(12) United States Patent
Ahmed et al.

(10) Patent No.: US 10,878,033 B2
(45) Date of Patent: Dec. 29, 2020

(54) SUGGESTING FOLLOW UP QUESTIONS FROM USER BEHAVIOR

(71) Applicant: INTERNATIONAL BUSINESS MACHINES CORPORATION, Armonk, NY (US)

(72) Inventors: Mohamed N. Ahmed, Leesburg, VA (US); Charles E. Beller, Baltimore, MD (US); William G. Dubyak, Severna Park, MD (US); Palani Sakthi, Palatine, IL (US); Kristen M. Summers, Takoma Park, MD (US); Andeep S. Toor, Chantilly, VA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 15/829,601

(22) Filed: Dec. 1, 2017

(65) Prior Publication Data

US 2019/0171726 A1    Jun. 6, 2019

(51) Int. Cl.
*G06N 20/00* (2019.01)
*G06F 16/9038* (2019.01)
(Continued)

(52) U.S. Cl.
CPC .... *G06F 16/90324* (2019.01); *G06F 16/9038* (2019.01); *G06F 16/90332* (2019.01); *G06F 16/9535* (2019.01); *G06N 20/00* (2019.01)

(58) Field of Classification Search
CPC .......... G06F 16/90332; G06F 16/9535; G06F 16/9024; G06F 16/90324; G06F 16/90335; G06N 20/00
(Continued)

(56) References Cited

U.S. PATENT DOCUMENTS

| 8,275,803 B2 | 9/2012 | Brown et al. |
| 9,336,526 B2 | 5/2016 | Tuchman et al. |

(Continued)

FOREIGN PATENT DOCUMENTS

WO    2014026058 A1    2/2014

OTHER PUBLICATIONS

Rudloff, "Complete List of Behavioral Interview Questions", May 21, 2007, 18 Pages, http://www.hsu.edu/Career/completelistofbehavioral.pdf.

(Continued)

*Primary Examiner* — Robert W Beausoliel, Jr.
*Assistant Examiner* — Pedro J Santos
(74) *Attorney, Agent, or Firm* — Anthony M. Pallone

(57) ABSTRACT

An embodiment of the invention may include a method, computer program product and system for generating follow-up questions based on machine learning utilizing a computing device. The embodiment may include receiving an input question from a user. The embodiment may include parsing the received input question to extract input question components. Parsing utilizes natural language processing techniques. The embodiment may include executing trained question component models to predict follow-up question components. The extracted input question components are utilized as inputs to the trained question component models. The embodiment may include combining the predicted follow-up question components to generate one or more follow-up questions. The embodiment may include returning the one or more follow-up questions to the user.

20 Claims, 6 Drawing Sheets

(51) Int. Cl.
*G06F 16/9535* (2019.01)
*G06F 16/9032* (2019.01)

(58) Field of Classification Search
USPC .......................................... 707/728, E17.066
See application file for complete search history.

(56) References Cited

U.S. PATENT DOCUMENTS

| | | | |
|---|---|---|---|
| 2011/0010202 A1* | 1/2011 | Neale | G06N 5/025 |
| | | | 705/4 |
| 2011/0123967 A1* | 5/2011 | Perronnin | G09B 17/006 |
| | | | 434/178 |
| 2011/0125734 A1 | 5/2011 | Duboue et al. | |
| 2013/0054435 A1* | 2/2013 | Zhang | G06Q 40/02 |
| | | | 705/35 |
| 2016/0148093 A1* | 5/2016 | Adderly | G06N 5/022 |
| | | | 706/46 |
| 2016/0171062 A1 | 6/2016 | Bufe et al. | |
| 2016/0180237 A1 | 6/2016 | Ahuja et al. | |
| 2017/0177675 A1 | 6/2017 | Beller et al. | |
| 2017/0206241 A1 | 7/2017 | Beller et al. | |

OTHER PUBLICATIONS

Anonymous, "Automatic Error Analysis Advisor for Question Answering Systems", An IP.Com Prior Art Database Technical Disclosure, IP.Com No. IPCOM000247245D, Aug. 17, 2016, 6 Pages, IP.Com.

Anonymous, "Question Chaining: Method for Asking Follow-Up Questions to a Previous Question in a Similar Context to Refine a Set of Answers from the Same Answer Bucket in a Natural Language Question Answer (NLQA) System", An IP.Com Prior Art Database Technical Disclosure, IP.Com No. IPCOM000237479D, Jun. 18, 2014, 3 Pages.

Anonymous, "A Self-Diagnosing Question Answering System", An IP.Com Prior Art Database Technical Disclosure, IP.Com No. IPCOM000247244D, Aug. 17, 2016, 6 Pages, IP.Com.

U.S. Appl. No. 15/625,402, entitled "Leveraging Extracted Entity and Relation Data to Automatically Filter Data Streams", filed Jun. 16, 2017, 22 Pages.

Mittal et al., "Dynamic Generation of Follow up Question Menus: Facilitating Interactive Natural Language Dialogues", CHI 1995 Mosaic of Creativity, May 7-11, 1995, pp. 90-97, ACM, Denver, CO.

U.S. Appl. No. 15/467,289, entitled "Leveraging Extracted Entity and Relation Data to Automatically Filter Data Streams", filed Mar. 23, 2017, 25 Pages.

* cited by examiner

US 10,878,033 B2

SUGGESTING FOLLOW UP QUESTIONS FROM USER BEHAVIOR

GOVERNMENT RIGHTS

This invention was made with government support under contract 2013-12101100008 awarded by the U.S. Department of Defense. The government has certain rights to this invention.

BACKGROUND

The present invention relates, generally, to the field of natural language processing, and more specifically, to suggesting follow-up questions within a question answering (QA) system.

Question answering is a computer science discipline within the fields of information retrieval and natural language processing (NLP). QA is concerned with building systems that automatically answer questions posed by humans in natural language. A QA implementation may construct its answers by querying a structured database such as a knowledge base. More commonly, a QA implementation may also derive answers from an unstructured collection of natural language documents. A QA system may be implemented in a closed-domain which deals with questions under a specific domain (e.g., medicine) and exploits domain-specific knowledge frequently formalized in ontologies. Additionally, a QA system may also be implemented in an open-domain which deals with questions about nearly anything and relies on general ontologies and world knowledge.

BRIEF SUMMARY

An embodiment of the invention may include a method, computer program product and system for generating follow-up questions based on machine learning utilizing a computing device. The embodiment may include receiving an input question from a user. The embodiment may include parsing the received input question to extract input question components. Parsing utilizes natural language processing techniques. The embodiment may include executing trained question component models to predict follow-up question components. The extracted input question components are utilized as inputs to the trained question component models. The embodiment may include combining the predicted follow-up question components to generate one or more follow-up questions. The embodiment may include returning the one or more follow-up questions to the user.

DETAILED DESCRIPTION

Figure 1:
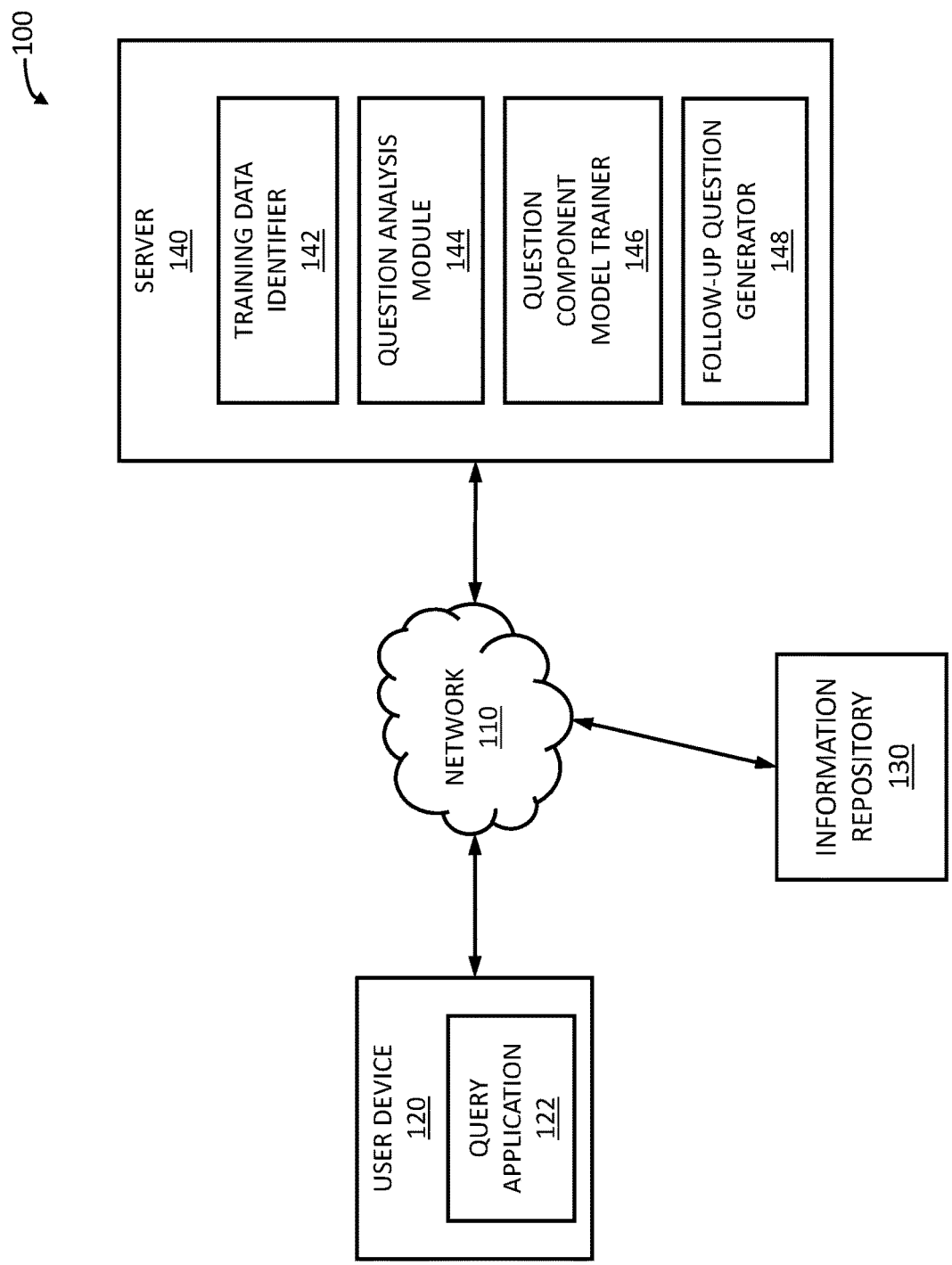
FIG. 1 is a block diagram illustrating a question answering system, in accordance with an embodiment of the present invention.

With the increased usage of computing networks, such as the Internet, users are currently inundated and overwhelmed with the amount of information available to them from various structured and unstructured sources. Moreover, information gaps abound as users try to piece together relevant search results during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

For example, the Watson™ system, available from International Business Machines (IBM) Corporation of Armonk, N.Y., is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure. Another example is the Watson Discovery Advisor™, also available from IBM Corporation of Armonk, N.Y., which allows analysts to discover information from unstructured data sources by using natural language questions. Watson Discovery Advisor™ leverages Watson™ application program interfaces (APIs) to add NLP metadata to unstructured data sources thus enabling the discovery of useful insights/patterns within different types of data.

Nevertheless, the discovery of potential insights and patterns within data, as offered by tools such as Watson Discovery Advisor™, may be limited by an analyst's use of such tool. An experienced analyst (i.e., an expert user) may derive useful insights within data and observe patterns within data much more rapidly than a less experienced analyst (i.e., less skilled user) due to the experienced analyst's skill with asking pertinent follow-up questions. This is in part an intuitive ability, typically gained through experience. An expert user's increased skill in asking germane follow-up questions makes using Watson Discovery Advisor™, and similar tools, more effective. Whereas low skill with asking germane follow-up questions makes the use of such tools less effective and creates a barrier to their adoption.

Embodiments of the present invention may include a question answering (QA) system 100, described below, which provides a method for automatically suggesting follow-up questions based on patterns of previously observed behavior (i.e., previously asked questions) of expert users. QA system 100 may identify training data from an expert user's tracked use of the QA system. QA system 100 may also train models, based on the identified training data, to predict features of a following question in a sequence given a preceding question. Furthermore, in response to an input question from a different user, QA system 100 may deploy the trained models against the input question to generate components of a potential follow-up question. Lastly, QA system 100 may combine the generated components to construct one or more follow-up questions for suggestion to the different user.

Embodiments of the present invention will now be described in detail with reference to the accompanying Figures.

FIG. 1 is a functional block diagram illustrating question answering system 100, in accordance with an embodiment of the present invention. In an example embodiment, question answering system 100 may include user device 120, information repository 130, and server 140, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between user device 120, information repository 130, and server 140.

In an example embodiment, user device 120 may include query application 122. User device 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as server 140, via network 110, and capable of supporting the functionality required of embodiments of the invention. While user device 120 is shown as a single device, in other embodiments, user device 120 may be comprised of a cluster or plurality of computing devices, working together or working separately. User device 120 may be described generally with respect to FIG. 4 below.

In an example embodiment, query application 122 may be a program, or subroutine contained in a program, that may operate to receive one or more questions from a user, track session information belonging to a user, and present one or more follow-up questions for suggested use by a user. Query application 122 may result from any commercially available, open source, or proprietary software (e.g., Watson Discovery Advisor™) that takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure, in accordance with embodiments of the invention. In an example embodiment, query application 122 receives one or more questions from a user of user device 120 and transmits, via network 110, those received questions to server 140. Query application 122 also transmits session information belonging to the user to information repository 130. Furthermore, in an example embodiment, query application 122 displays one or more follow-up questions to the user of user device 120 for suggested use.

In an example embodiment, information repository 130 may be a desktop computer, a notebook, a laptop computer, a blade server, a networked computer appliance, a virtual device, a thin client, or any other networked electronic device or computing system capable of receiving and sending data from and to other computing devices such as user device 120 and server 140, via network 110, and capable of supporting the functionality required of embodiments of the invention. In an example embodiment, information repository 130 may store session information belonging to a user of query application 122. Session information may include query logs of the user, application usage details (e.g., sign-in/out, duration) of the user, application proficiency level of the user, and sequences of questions asked by the user. Information repository 130 may also store training data identified by training data identifier 142, described below, and parsed output from question analysis module 144, described below. Furthermore, in an example embodiment, information repository 130 may also store one or more trained question component models for use by follow-up question generator 146, described below. Trained question component models may include a model for question entity prediction, a model for question type (e.g., who, what, where) prediction, a model for question relationship type prediction, a model for lexical answer type (LAT) prediction, and a model for question class (QCLASS) prediction. While information repository 130 is shown as a single device, in other embodiments, information repository 130 may be comprised of a cluster or plurality of computing devices, working together or working separately. information repository 130 may be described generally with respect to FIG. 4 below.

In an example embodiment, server 140 may include training data identifier 142, question analysis module 144, question component model trainer 146, and follow-up question generator 146. Server 140 may be a desktop computer, a notebook, a laptop computer, a blade server, a networked computer appliance, a virtual device, a thin client, or any other networked electronic device or computing system capable of receiving and sending data from and to other computing devices such as user device 120 and information repository 130, via network 110, and capable of supporting the functionality required of embodiments of the invention. While server 140 is shown as a single device, in other embodiments, server 140 may be comprised of a cluster or plurality of computing devices, working together or working separately. Server 140 may be described generally with respect to FIG. 4 below.

In an example embodiment, training data identifier 142 may be a program, or subroutine contained in a program. Training data identifier 142 operates to identify training data from expert user use of query application 122. In an example embodiment, training data identifier 142 may retrieve, from information repository 130, session information belonging to an expert user of query application 122. A user of query application 122 may be designated as an expert user based on the application proficiency level of the user. Training data may be a collection of sequences of questions, relevant to a single line of inquiry, asked by an expert user within a single timespan (i.e., application session). In identifying training data, training data identifier 142 may first parse the retrieved session information to identify potential sequences of questions. Once training data identifier 142 has identified a sequence of questions asked by an expert user, training data identifier 142 may then determine whether the questions within the identified sequence are relevant to a single line of inquiry. In an example embodiment, training data identifier 142 identifies a sequence of questions, asked by an expert user and relevant a single line of inquiry, to be used as training data. In addition, training data identifier 142 may store the identified training data within information repository 130. The operations and functions of training data identifier 142 are described in further detail below with regard to FIG. 2.

In an example embodiment, question analysis module 144 may be a program, or subroutine contained in a program, that may operate to receive an input question in a natural language format and parse the question using natural language processing (NLP) techniques to extract and classify major features from the input question according to question component types, e.g., entity type, relationship type, question type, or any of a plethora of other defined types. In addition, the extracted major features may include key words and phrases classified into question characteristics, such as the lexical answer type (LAT) or QCLASS of the question. A LAT is a word in, or a word inferred from, the input question that indicates the type (i.e., the descriptor) of the answer. QCLASS is a broader, coarser gained classification. For example, in the question "Who was the first president of the United States?", the LAT would be president, whereas the QCLASS would be factoid. Furthermore, in an example embodiment, question analysis module 144 may operate to parse, using the above-mentioned NLP techniques, identified training data. Question analysis module 144 may store parsed output within information repository 130. In an example embodiment, question analysis module 144 may receive and parse training data identified by training data identifier. Question analysis module 144 may also receive and parse input questions asked via query application 122.

In an example embodiment, question component model trainer 146 may be a program, or subroutine contained in a program, that may operate to train question component models within QA system 100. Question component models may include a model for entity type prediction, a model for question type prediction, a model for relationship type prediction, and a model for LAT type prediction. Question component model trainer 146 may apply known machine learning (ML) algorithms to parsed identified training data in order to determine question component patterns within the training data that can be used to make predictions on new data (e.g., new input questions). In an example embodiment, question component model trainer 146 may apply ML algorithms to training data, identified by training data identifier 142 and parsed by question analysis module 144, in order to create trained component models for entity prediction, question type prediction, relationship type prediction, and LAT prediction for use by follow-up question generator 148, described below. Additionally, in an example embodiment, question component model trainer 146 may store created trained component models within information repository 130.

In an example embodiment, follow-up question generator 148 may be a program, or subroutine contained in a program, that may operate to generate one or more follow-up questions for suggested use by a user of query application 122. Follow-up question generator 148 may generate the one or more follow-up questions in response to one or more input questions from the user. Furthermore, the generated follow-up question(s) may be derived from previously observed behavior from expert users of query application 122. In an example embodiment, follow-up question generator 148 may receive an input question from a user of query application 122. Follow-up question generator 148 may direct question analysis module 144 to parse the received input question in order to generate question components. In furtherance of the example embodiment, follow-up question generator 148 may then deploy the trained component models, created by question component model trainer 146 and based on previously observed expert user behavior, for entity type prediction, for question type prediction, for relationship type prediction, and for LAT prediction in order to predict potentially useful question components for suggested follow-up questions. Furthermore, follow-up question generator 148 may subsequently combine the predicted question components to generate one or more grammatical, natural language questions for suggested use, by the user of query application 122, as a follow-up question. In an example embodiment, follow-up question generator 148 may also filter a generated follow-up question for grammaticality by parsing the follow-up question and comparing a confidence score of the parse against a threshold value. The operations and functions of follow-up question generator 146 are described in further detail below with regard to FIG. 3.

Figure 2:
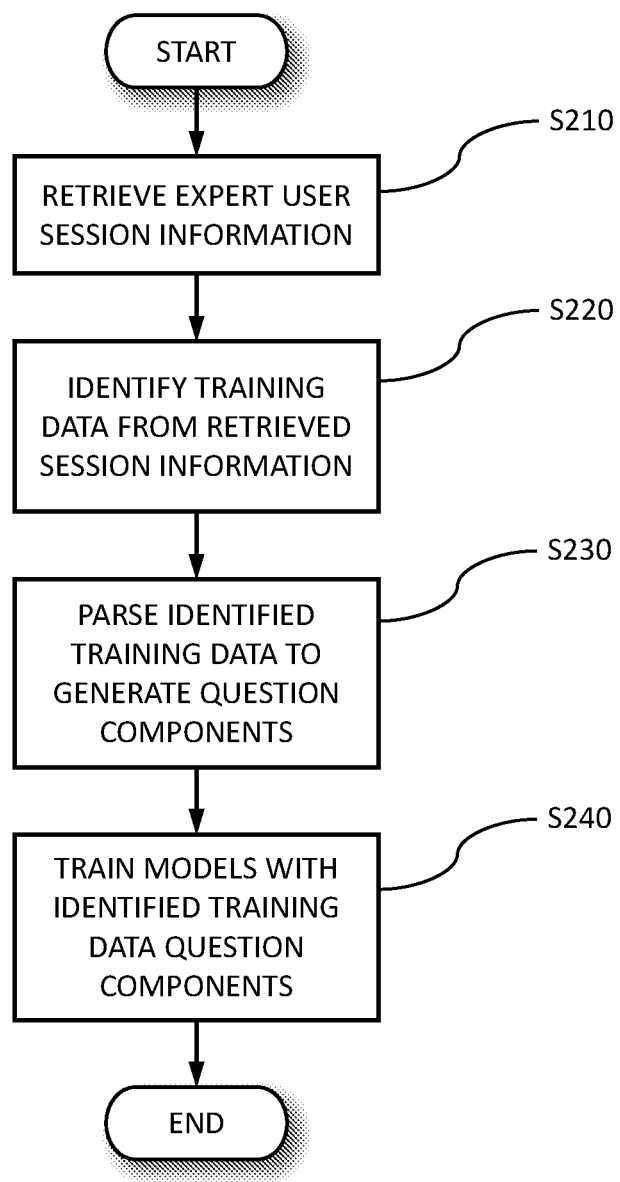
FIG. 2 is a flowchart illustrating the operations of the question analysis module of FIG. 1, in accordance with an embodiment of the invention.

FIG. 2 shows a flowchart illustrating the operations of training data identifier 142 in accordance with an example embodiment of the invention. Referring to step S210, training data identifier 142 may retrieve, via network 110, the session information of an expert user of query application 122. The retrieved session information may result from an expert user inputting a sequence of questions into query application 122 and from tracking, performed by query application 122, of the expert user's behavior. In an example embodiment, training data identifier 142 retrieves, via network 110, the session information of an expert user of query application 122 from information repository 130.

Referring to step S220, training data identifier 142 may identify training data from the expert user's session information retrieved in step S210. Training data may be a collection of sequences of questions, relevant to a single line of inquiry, asked by an expert user within a single timespan (i.e., application session). Questions are assumed to be relevant to a single line of inquiry if they meet a topic similarity criterion or a graph connection criterion. Topic similarity may be a function of string edit distance between two questions within a sequence. The two questions are considered topic similar, and thus relevant to a single line of inquiry, if the edit distance is below some threshold. Topic similarity essentially asks if the questions are similar on some metric (e.g., similar tokens, shared words). Moreover, if there exists a topic model from some corpus and if both questions map to the same topic cluster within the topic model, then the two questions are considered topic similar. Alternatively, a graph connection criterion is met where there exists K paths of length L within a knowledge graph connecting entities mentioned in consecutive questions within a sequence of questions. A knowledge graph is essentially a storage of triples of relationships (i.e., two entities and a relationship between them). For example, one entity may be "Charles", the other entity may be "IBM", and the relationship between them may be "employee of". A function of a knowledge graph is that it provides known connections between entities. Therefore, if we have some number of paths of some length within the knowledge graph connecting entities mentioned within two questions (e.g., if there are 3 connections of lengths 2 or less (2 hops or less) between entities in the first question and entities in the second question), then they may be close enough within the knowledge graph to say that these questions are likely within a single line of inquiry. In an example embodiment, training data identifier 142 identifies training data from the expert user's session information retrieved in step S210.

Referring to step S230, training data identifier 142 may direct question analysis module 144 to parse, using NLP techniques, information identified as training data. Consequently, question analysis module 144 may extract and classify major features from the identified training data according to question component types (e.g., entity type, relationship type, question type). In addition, the extracted major features of the identified training data may include key words and phrases classified into question characteristics, such as the lexical answer type (LAT). In an example embodiment, training data identifier 142 directs question analysis module 144 to parse the training data identified in step S220 which results in question components being extracted from the identified training data.

Referring to step S240, training data identifier 142 may direct question component model trainer 146 to train question component models utilizing question components extracted from identified training data. Question component model trainer 146 may apply known machine learning (ML) algorithms to parsed identified training data in order to determine question component patterns within the training data that can be used to make predictions on new data (e.g., new input questions). For example, identified training data may contain a sequence of questions in which the first question asks who was the first president of the United States and the second question asks who was the first vice president of the United States. After parsing the identified training data, via question analysis module 144, it may be determined that the LAT in the first question was president and that the LAT in the second question was vice president. Consequently, the resulting trained model for LAT prediction, after applying known ML algorithms, may predict that given a first LAT of president, the second LAT will be vice president and therefore, follow-up question generator 148 may suggest a follow-up question about vice presidents. In another example, the same technique may be applied to entity components within the parsed identified training data in order to predict entities that may appear in a second question, given entities that appear in a first question. In yet another example, the same technique may be applied to question type components (e.g., who, what, or where) within the parsed identified training data in order to predict question types that may appear in a second question, given question types that appear in a first question. In still another example, the same technique may be applied to relationship type components within the parsed identified training data in order to predict relationship types that may appear in a second question, given relationship types that appear in a first question. In an example embodiment, training data identifier 142 directs question component model trainer 146 to train question component models utilizing the question components extracted from the identified training data in step S230. Furthermore, in an example embodiment, training data identifier 142 stores the trained question component models in information repository 130.

Figure 3:
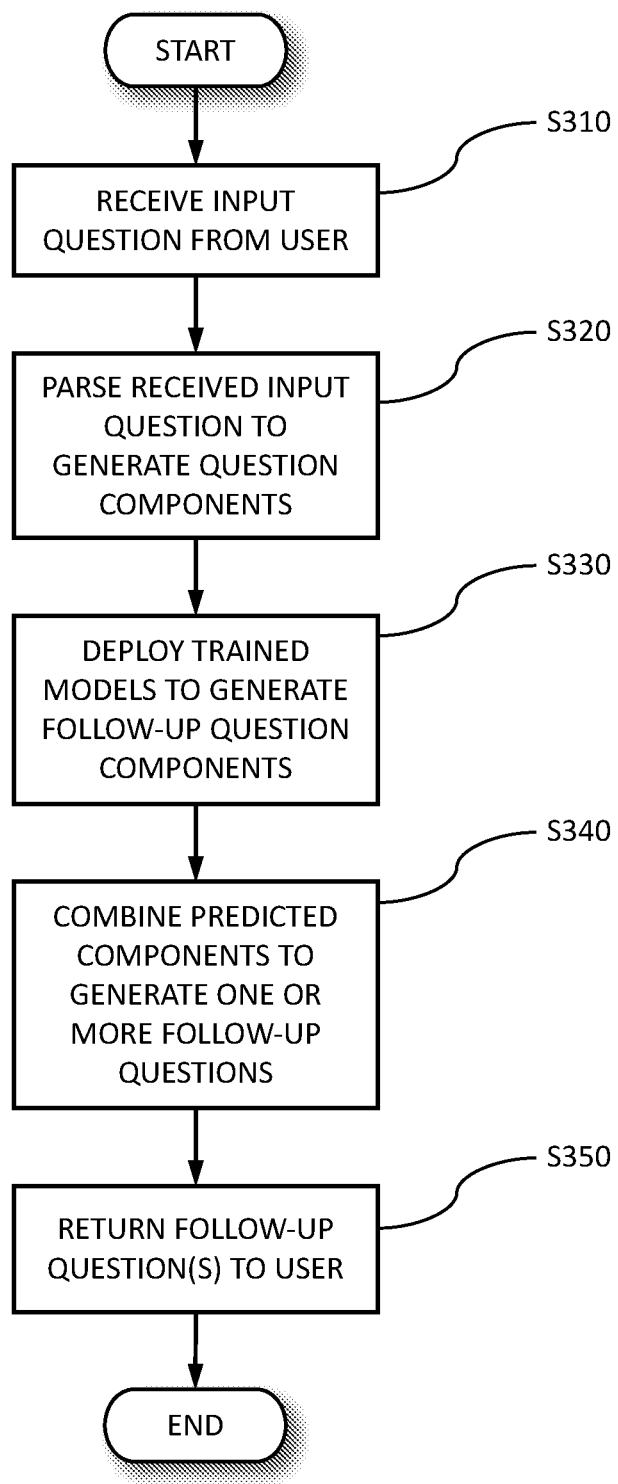
FIG. 3 is a flowchart illustrating the operations of the follow-up question generator of FIG. 1, in accordance with another embodiment of the invention.

FIG. 3 shows a flowchart illustrating the operations of follow-up question generator 148, in accordance with an example embodiment of the invention. Referring to step S310, follow-up question generator 148 may receive, via network 110, an input question. The received input question may result from a user inputting a natural language question into query application 122. In an example embodiment, follow-up question generator 148 receives a natural language question from a user of query application 122.

Referring to step S320, follow-up question generator 148 may direct question analysis module 144 to parse, using NLP techniques, a received input question. Consequently, question analysis module 144 may extract and classify major features from the received input question according to question component types (e.g., entity type, relationship type, question type). In addition, the extracted major features of the received input question may include key words and phrases classified into question characteristics, such as the lexical answer type (LAT). In an example embodiment, follow-up question generator 148 directs question analysis module 144 to parse the natural language input question received in step S310 which results in question components being extracted from the received input question.

Referring to step S330, follow-up question generator 148 may deploy trained question component models retrieved from information storage 130. In deploying the trained question component models, follow-up question generator 148 may run each model (e.g., a model for question entity prediction, a model for question type prediction, a model for question relationship type prediction, and a model for lexical answer type (LAT) prediction) utilizing question components extracted from the input question in order to generate question components for one or more potential follow-up questions to the input question. For example, follow-up question generator 148 may run the trained model for entity type prediction utilizing the entity types extracted from the input question as inputs to the model. In another example, follow-up question generator 148 may run the trained model for relationship type prediction utilizing the relationship types extracted from the input question as inputs to the model. In yet another example, follow-up question generator 148 may run the trained model for LAT type prediction utilizing the LAT types extracted from the input question as inputs to the model. In each example, the trained question component model will predict question components for use in one or more follow-up questions. In an example embodiment, follow-up question generator 148 deploys the trained question component models, retrieved from information storage 130, utilizing the question components extracted from the input question in step S320 as inputs to the models in order to predict question components for one or more follow-up questions.

Referring to step S340, follow-up question generator 148 may combine predicted question components in order to generate one or more follow-up questions in response to an input question. In an example embodiment, follow-up question generator 148 may generate a follow-up question in the same form as the input question while replacing one or more question component types (e.g., entity type, relationship type, LAT type). For example, in a situation where QA system 100 has determined that questions about vice presidents are frequent follow-up questions to questions about presidents, follow-up question generator 148 may replace the LAT type "president" with the LAT type "vice president" and suggest a follow-up question of "Who was the first vice president of the U.S.?", in response to an input question of "Who was who was the first president of the U.S.?". The same replacement technique may be applied to relationship and entity types. In another embodiment, follow-up question generator 148 may determine that the predicted question type is a switch from a "what" input question to a "who" follow-up question and therefore generating a follow-up question in the same form as the input question would be inappropriate. In such a situation, follow-up question generator 148 may generate a "who" follow-up question from the predicted entity and a list of predicted relationship types or LAT types. In yet another embodiment, follow-up question generator 148 may generate one or more follow-up questions from a menu of question templates with open slots for entity types and relationship types. Follow-up question generator 148 may populate the open slots with predicted entity types and relationship types based on the entity types and relationship types in the input question. As this may generate a potentially large number of follow-up questions, follow-up question generator 148 may rank generated questions from most to least useful. In an example embodiment, follow-up question generator 148 combines the predicted question components generated in step S330 to generate one or more follow-up questions in response to the input question received in step S310.

Referring to step S350, follow-up question generator 148 may return, via network 110, one or more generated follow-up questions for suggested use by a user. In an example embodiment, follow-up question generator 148 returns the one or more follow-up questions generated in step S340 to query application 122 for suggested use by the user in response to the user's input question.

Figure 4:
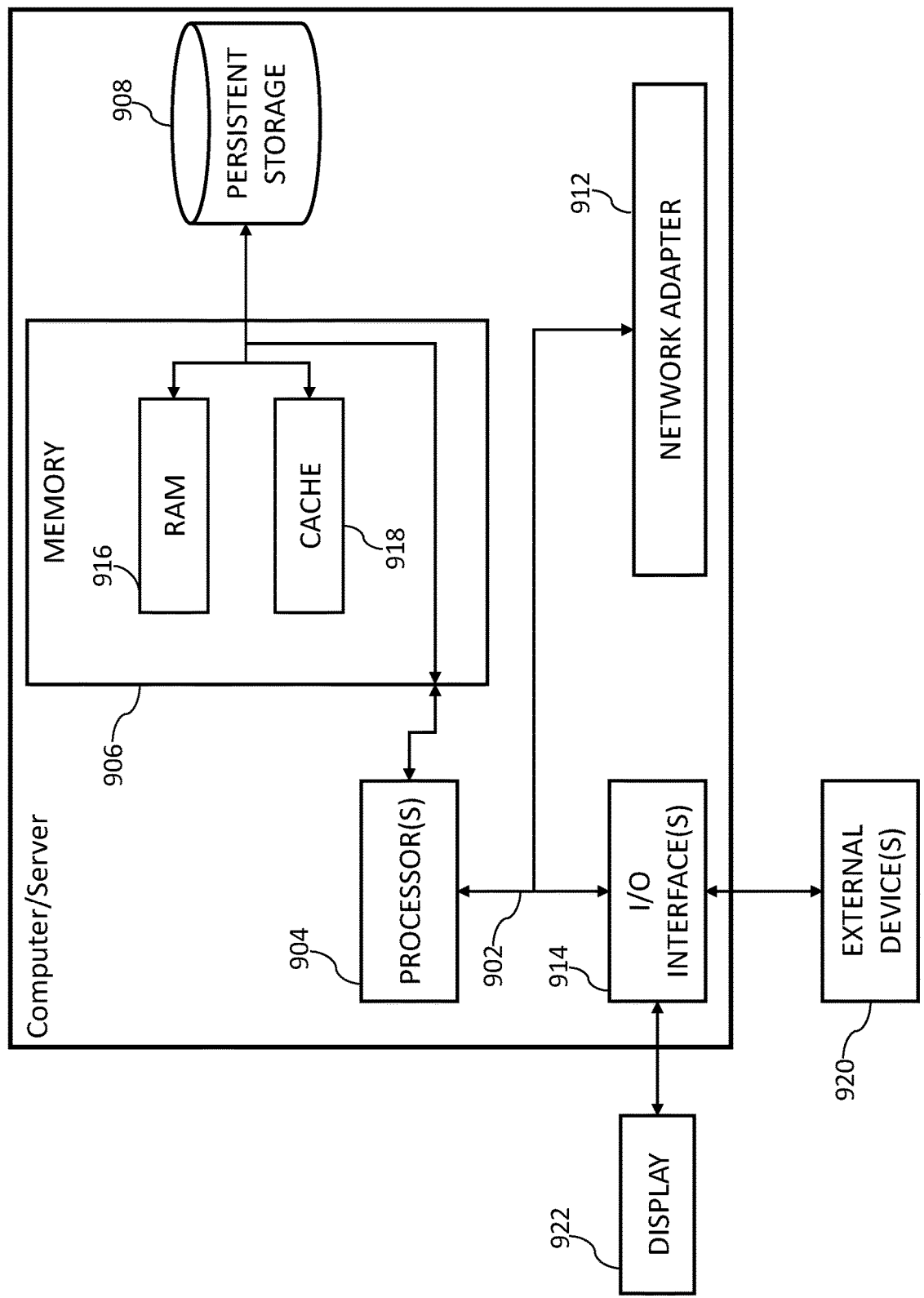
FIG. 4 is a block diagram depicting the hardware components of the question answering system of FIG. 1, in accordance with an embodiment of the invention.

FIG. 4 depicts a block diagram of components of user device 120, information repository 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

User device 120, information repository 130, and server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs query application 122 in user device 120; and training data identifier 142, question analysis module 144, question component model trainer 146, and follow-up question generator 148 in server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs query application 122 in user device 120; and training data identifier 142, question analysis module 144, question component model trainer 146, and follow-up question generator 148 in server 140 may be downloaded to persistent storage 908 through network adapter 912.

I/O interface(s) 914 allows for input and output of data with other devices that may be connected to user device 120, information repository 130, and server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs query application 122 in user device 120; and training data identifier 142, question analysis module 144, question component model trainer 146, and follow-up question generator 148 in server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
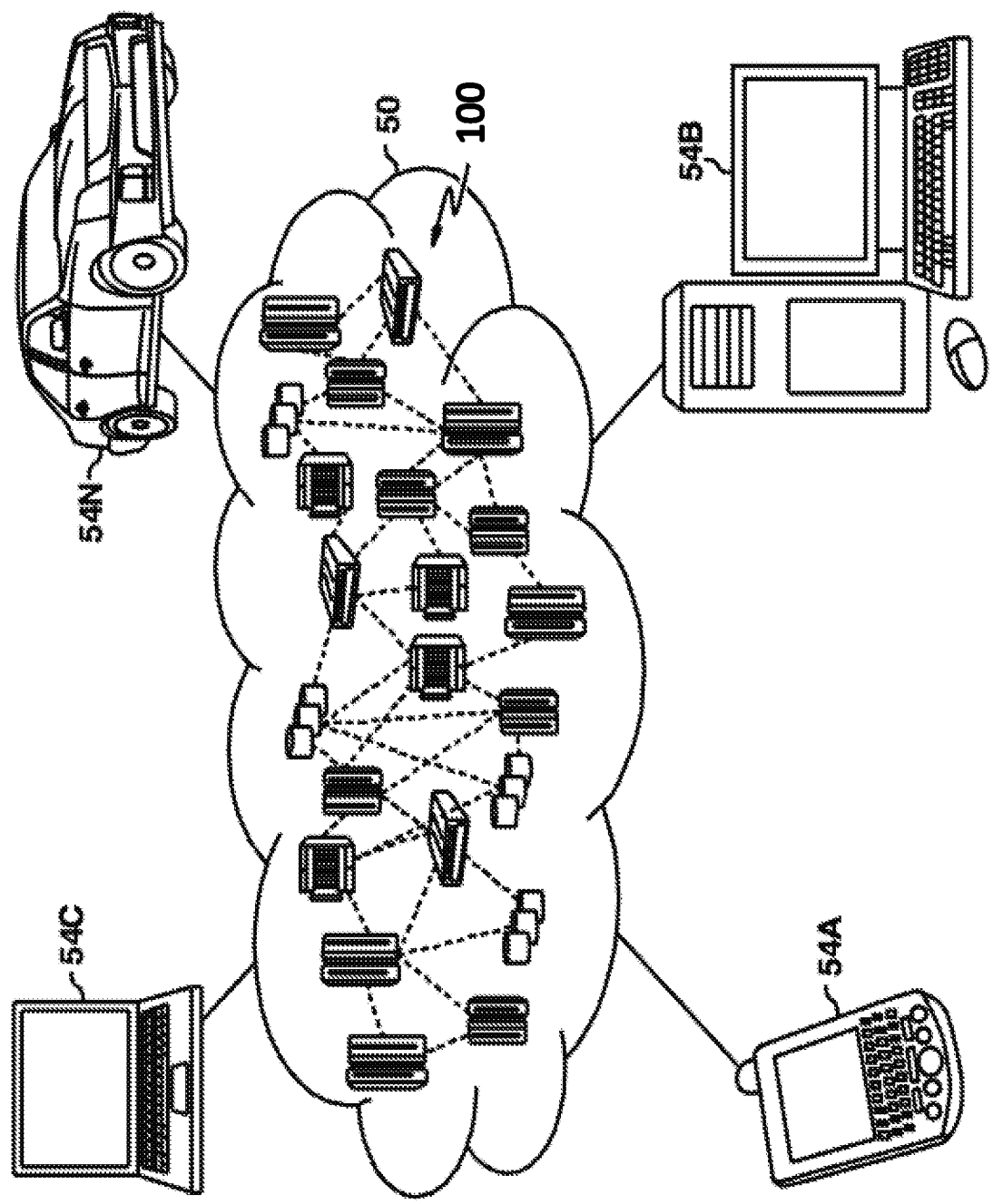
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
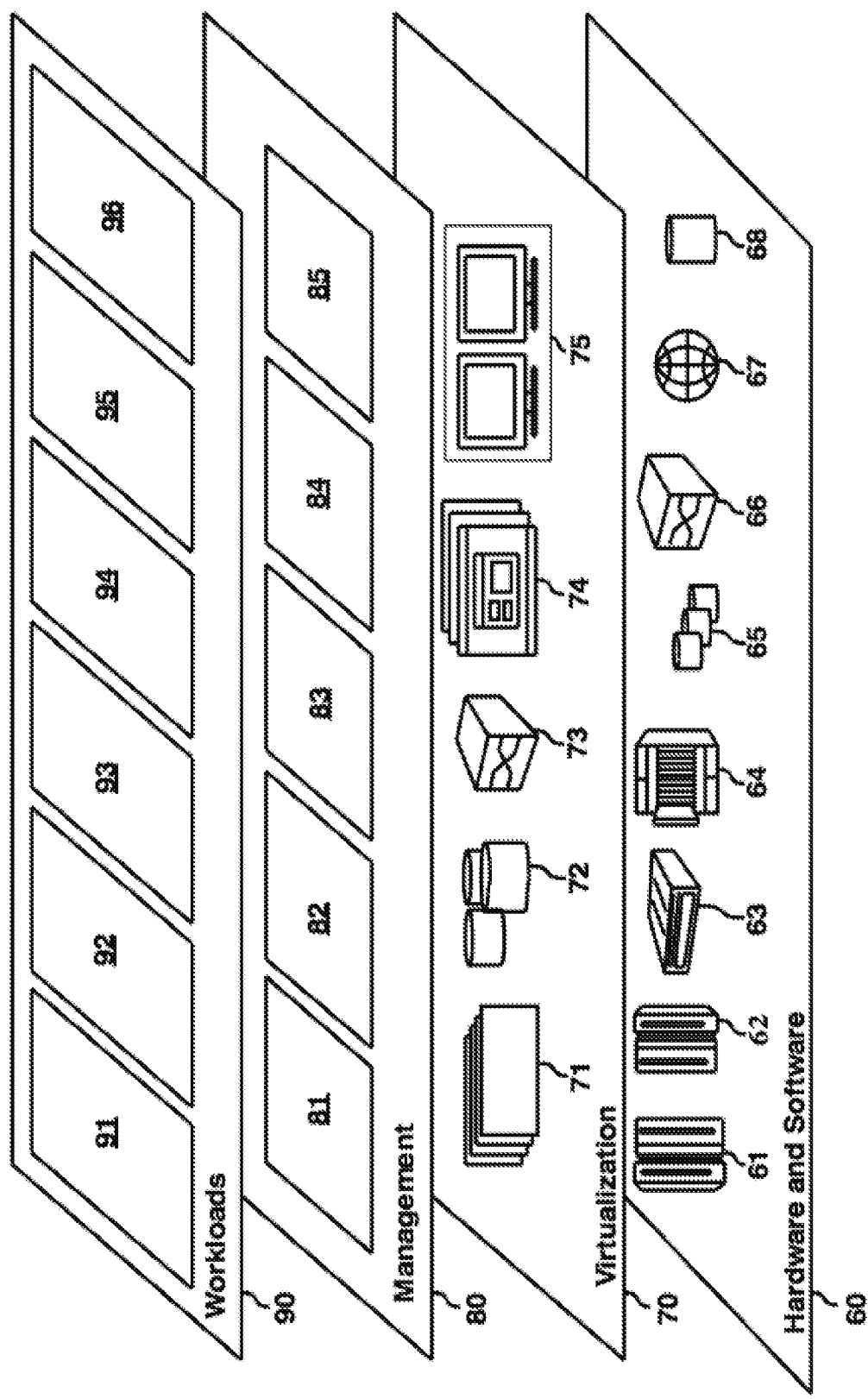
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and question answering system 96. Question answering system 96 may relate to implementing a question answering system which suggests follow-up questions in response to an input question.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for generating follow-up questions based on machine learning utilizing a computing device, the method comprising:
   receiving an input question from a user;
   parsing the received input question to extract input question components, wherein parsing utilizes natural language processing techniques;
   executing trained question component models to predict follow-up question components, wherein the extracted input question components are utilized as inputs to the trained question component models;
   combining the predicted follow-up question components to generate one or more follow-up questions;
   filtering the one or more follow-up questions for grammaticality by parsing the one or more follow-up questions and comparing a confidence score of a parse against a threshold value; and
   returning the one or more follow-up questions to the user.

2. The method of claim 1, wherein the trained question component models are selected from the group consisting of a model for lexical answer type prediction, a model for entity type prediction, a model for question type prediction, and a model for question relationship type prediction.

3. The method of claim 1, wherein the trained question component models are created utilizing training data generated by an expert user, and wherein the training data comprises a sequence of questions asked by the expert user, and wherein the sequence of questions is relevant to a single line of inquiry, and wherein the sequence of questions is relevant to a single line of inquiry if it satisfies a criterion selected from the group consisting of a topic similarity criterion and a graph connection criterion.

4. The method of claim 3, wherein the training data generated by the expert user is parsed, utilizing natural language processing techniques, to extract training data question components, and wherein machine learning algorithms are applied to the training data question components to determine training data question component patterns, and wherein the training data question component patterns are utilized to train the trained question component models.

5. The method of claim 4, wherein, the input question components, the follow-up question components, and the training data question components comprise an element from the group consisting of an entity type, a relationship type, a question type, and a lexical answer type.

6. The method of claim 1, wherein the one or more follow-up questions are in a same grammatical form as the input question.

7. The method of claim 1, further comprising:
   ranking the one or more follow-up questions from most useful to least useful.

8. A computer program product for generating follow-up questions based on machine learning utilizing a computing device, the computer program product comprising:
   one or more computer-readable tangible storage devices and program instructions stored on at least one of the one or more computer-readable tangible storage devices, the program instructions comprising:
      program instructions to receive an input question from a user;
      program instructions to parse the received input question to extract input question components, wherein parsing utilizes natural language processing techniques;
      program instructions to execute trained question component models to predict follow-up question components, wherein the extracted input question components are utilized as inputs to the trained question component models;
      program instructions to combine the predicted follow-up question components to generate one or more follow-up questions;
      program instructions to filter the one or more follow-up questions for grammaticality by parsing the one or more follow-up questions and comparing a confidence score of a parse against a threshold value; and
      program instructions to return the one or more follow-up questions to the user.

9. The computer program product of claim 8, wherein the trained question component models are selected from the group consisting of a model for lexical answer type prediction, a model for entity type prediction, a model for question type prediction, and a model for question relationship type prediction.

10. The computer program product of claim 8, wherein the trained question component models are created utilizing training data generated by an expert user, and wherein the training data comprises a sequence of questions asked by the expert user, and wherein the sequence of questions is relevant to a single line of inquiry, and wherein the sequence of questions is relevant to a single line of inquiry if it satisfies a criterion selected from the group consisting of a topic similarity criterion and a graph connection criterion.

11. The computer program product of claim 10, wherein the training data generated by the expert user is parsed, utilizing natural language processing techniques, to extract training data question components, and wherein machine learning algorithms are applied to the training data question components to determine training data question component patterns, and wherein the training data question component patterns are utilized to train the trained question component models.

12. The computer program product of claim 11, wherein, the input question components, the follow-up question components, and the training data question components comprise an element from the group consisting of an entity type, a relationship type, a question type, and a lexical answer type.

13. The computer program product of claim 8, wherein the one or more follow-up questions are in a same grammatical form as the input question.

14. The computer program product of claim 8, further comprising:
    ranking the one or more follow-up questions from most useful to least useful.

15. A computer system for generating follow-up questions based on machine learning utilizing a computing device, the computer system comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, the program instructions comprising:
        program instructions to receive an input question from a user;
        program instructions to parse the received input question to extract input question components, wherein parsing utilizes natural language processing techniques;
        program instructions to execute trained question component models to predict follow-up question components, wherein the extracted input question components are utilized as inputs to the trained question component models;
        program instructions to combine the predicted follow-up question components to generate one or more follow-up questions;
        program instructions to filter the one or more follow-up questions for grammaticality by parsing the one or more follow-up questions and comparing a confidence score of a parse against a threshold value; and
        program instructions to return the one or more follow-up questions to the user.

16. The computer system of claim 15, wherein the trained question component models are selected from the group consisting of a model for lexical answer type prediction, a model for entity type prediction, a model for question type prediction, and a model for question relationship type prediction.

17. The computer system of claim 15, wherein the trained question component models are created utilizing training data generated by an expert user, and wherein the training data comprises a sequence of questions asked by the expert user, and wherein the sequence of questions is relevant to a single line of inquiry, and wherein the sequence of questions is relevant to a single line of inquiry if it satisfies a criterion selected from the group consisting of a topic similarity criterion and a graph connection criterion.

18. The computer system of claim 17, wherein the training data generated by the expert user is parsed, utilizing natural language processing techniques, to extract training data question components, and wherein machine learning algorithms are applied to the training data question components to determine training data question component patterns, and wherein the training data question component patterns are utilized to train the trained question component models.

19. The computer system of claim 18, wherein, the input question components, the follow-up question components, and the training data question components comprise an element from the group consisting of an entity type, a relationship type, a question type, and a lexical answer type.

20. The computer system of claim 15, wherein the one or more follow-up questions are in a same grammatical form as the input question.

* * * * *